(12) United States Patent
Bruhn et al.

(10) Patent No.: US 7,311,479 B2
(45) Date of Patent: Dec. 25, 2007

(54) ROTATABLE TOOL AND A BLANK

(75) Inventors: Johnny Bruhn, Västerfarnebo (SE); Mattias Puide, Västeras (SE); Mattias Svensson, Skårblacka (SE); Anders Björk, Söderköping (SE); Jimmy Karlsson, Norrköping (SE); Mikael Grönqvist, Norrköping (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/164,760

(22) Filed: Dec. 5, 2005

(65) Prior Publication Data

US 2007/0020054 A1    Jan. 25, 2007

Related U.S. Application Data

(63) Continuation of application No. PCT/SE04/00857, filed on Jun. 2, 2004.

(30) Foreign Application Priority Data

Jun. 4, 2003  (SE) ................................. 0301617
Jun. 19, 2003 (SE) ................................. 0301828

(51) Int. Cl.
*B23B 51/06* (2006.01)
(52) U.S. Cl. ................ 408/59; 407/11; 408/230
(58) Field of Classification Search .......... 408/57, 408/59, 230; 407/11; *B23B 51/06*
See application file for complete search history.

(56) References Cited

U.S. PATENT DOCUMENTS

| | | | | |
|---|---|---|---|---|
| 329,174 A | * | 10/1885 | Johnson | ............ 408/230 |
| 4,583,888 A | * | 4/1986 | Mori et al. | ............ 408/59 |
| 4,963,059 A | * | 10/1990 | Hiyama | ............ 407/60 |
| 5,230,593 A | | 7/1993 | Imanaga et al. | |
| 5,438,858 A | | 8/1995 | Friedrichs | |
| 5,478,176 A | * | 12/1995 | Stedt et al. | ............ 408/59 |
| 5,704,740 A | * | 1/1998 | Ebenhoch et al. | ............ 408/59 |
| 5,800,101 A | * | 9/1998 | Jindai et al. | ............ 408/230 |
| 5,865,574 A | * | 2/1999 | Tukala | ............ 408/57 |
| 6,248,277 B1 | | 6/2001 | Friedrichs | |
| 6,652,203 B1 | * | 11/2003 | Risen, Jr. | ............ 408/225 |

FOREIGN PATENT DOCUMENTS

| | | |
|---|---|---|
| CH | 665979 | 6/1988 |
| DE | 2945635 | 5/1981 |
| EP | 1260296 | 11/2002 |
| FR | 1302191 | 9/1961 |
| JP | 62028105 A * | 2/1987 |
| JP | 59166405 A * | 9/1994 |
| JP | 11226810 A * | 8/1999 |

OTHER PUBLICATIONS

Internet translation of JP 11-226810.*
International Search Report from corresponding International Application No. PCT/SE2004/000857.

* cited by examiner

*Primary Examiner*—Daniel W. Howell
(74) *Attorney, Agent, or Firm*—WRB-IP LLP

(57) ABSTRACT

The present invention relates to a tool as well as a blank for manufacturing of the tool. The tool is made of solid cemented carbide and includes a shank for mounting in a rotatable spindle and chip flutes. Lines of intersection between the chip flutes and clearance surfaces form cutting edges at a cutting end of the tool. The flush channels extend through the entire tool in order to transfer flushing medium to the cutting end of the tool. The flush channels have varying pitch.

11 Claims, 5 Drawing Sheets

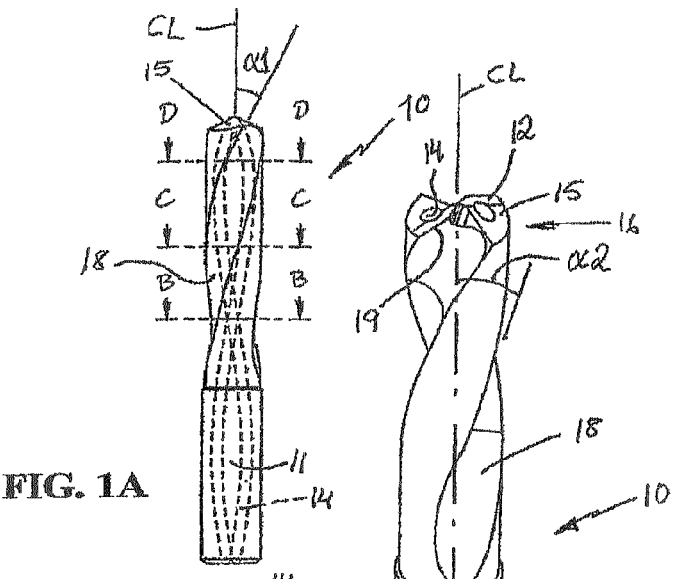
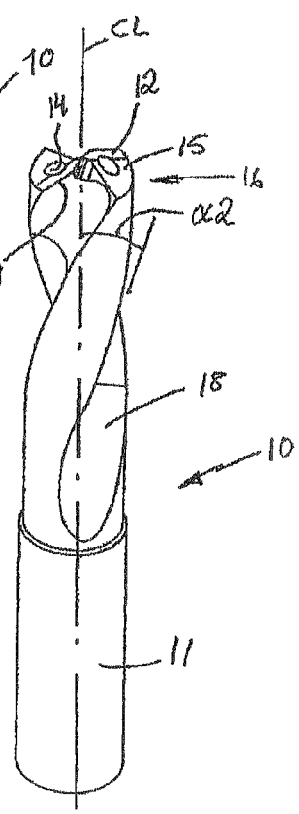
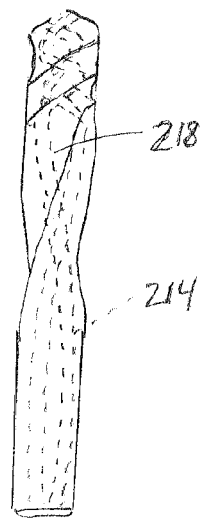
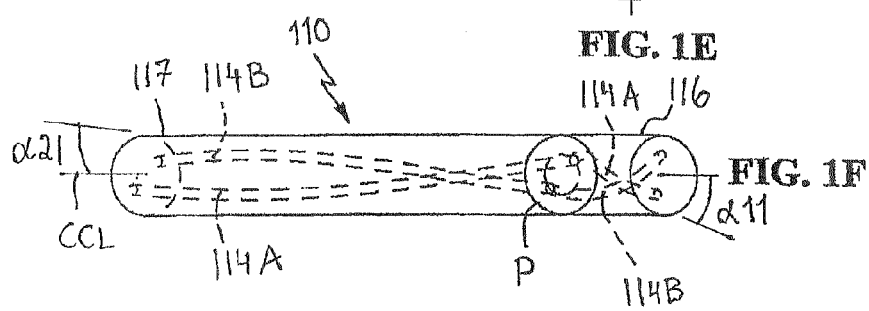
FIG. 1A
FIG. 1B
FIG. 1C
FIG. 1D
FIG. 1E
FIG. 1F
FIG. 1G

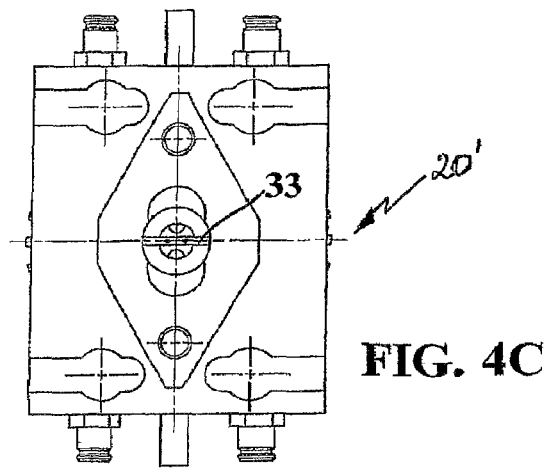
FIG. 4C
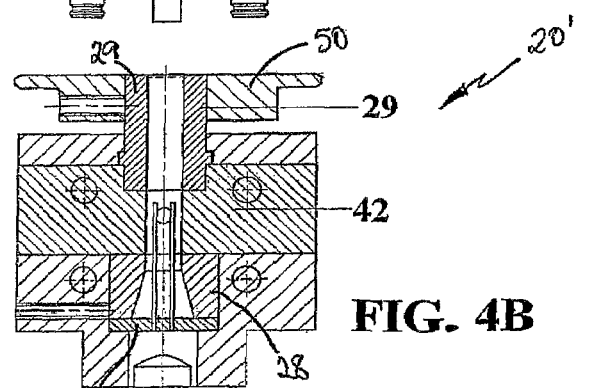
FIG. 4B
FIG. 3
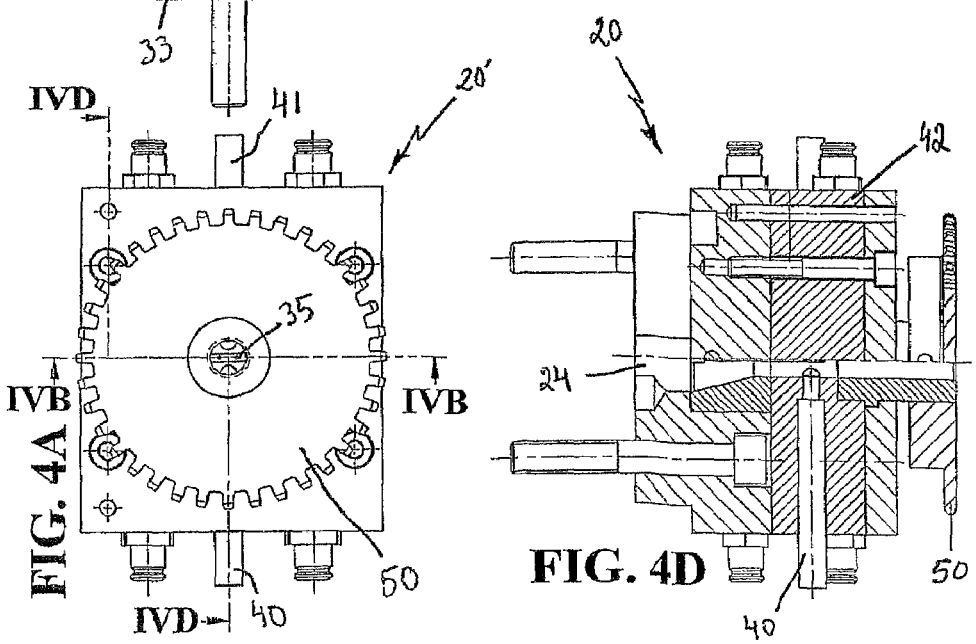
FIG. 4A
FIG. 4D

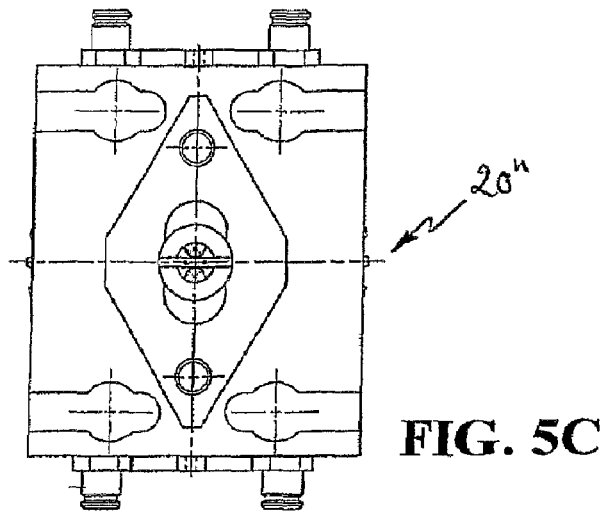
FIG. 5C
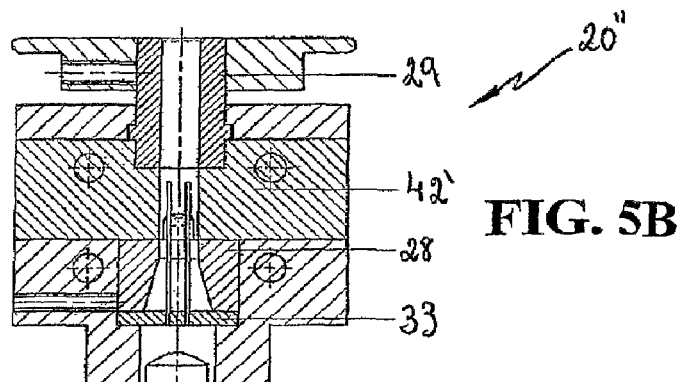
FIG. 5B
FIG. 5D
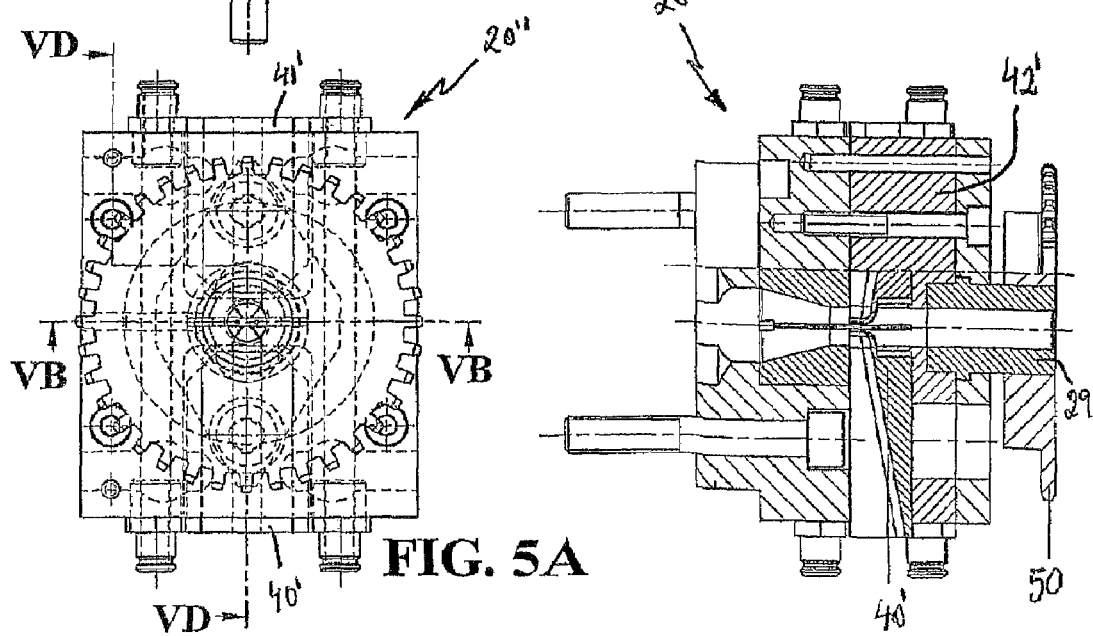
FIG. 5A

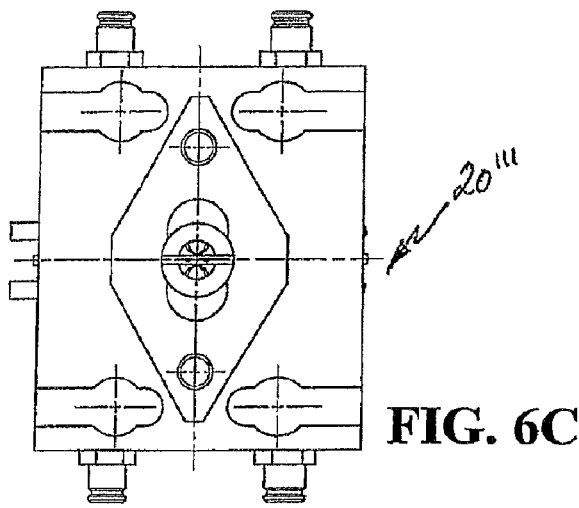
FIG. 6C
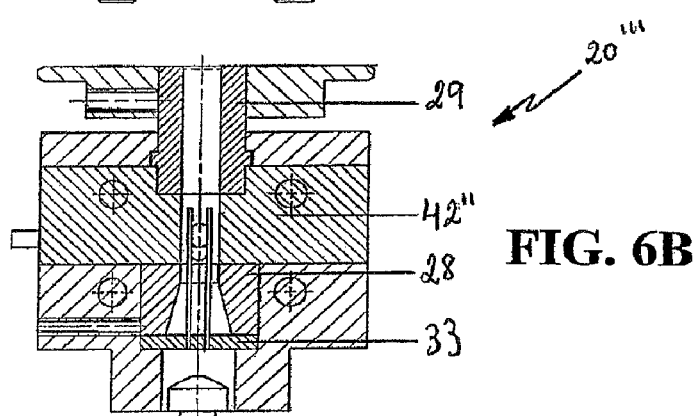
FIG. 6B
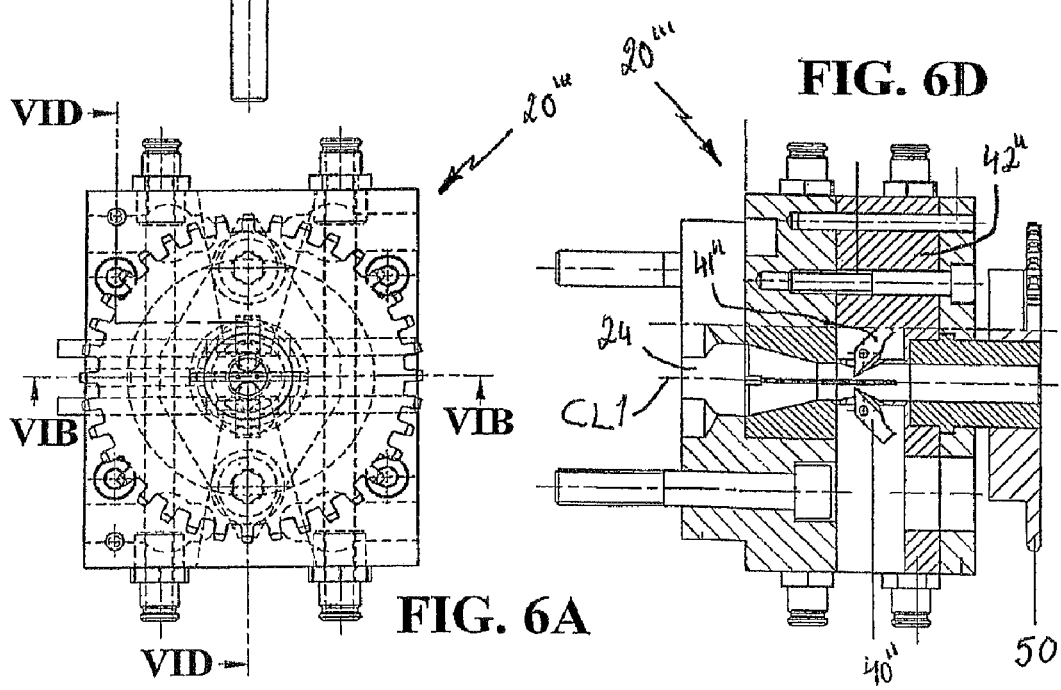
FIG. 6D
FIG. 6A

ROTATABLE TOOL AND A BLANK

BACKGROUND AND SUMMARY

The present application is a continuation of International Application No. PCT/SE04/00857, filed Jun. 2, 2004, which claims priority of SE 0301617-7, filed Jun. 4, 2003, and SE 0301828-0, filed Jun. 19, 2003, all three of which are incorporated by reference.

The present invention relates to a rotatable tool and a blank.

It is previously known through for example WO 98/28455 to press material powder, such as tungsten carbide (WC) together with cobalt (Co), between a punch and a die, and subsequently to sinter the material such that the binder metal is melted and binds the carbides to form tool material for chip removing machining. The known technique brings about a plurality of drawbacks. The powder give off dust and the formed green body (pressed but not sintered material) will not endure handling to any degree. Furthermore the chip flutes must be ground and the method requires time and energy. The problems have partly been solved by injection moulding of cemented carbide mixed in a carrier such as indicated in SE-B-9501687-9. The method of injection moulding brings a high degree of freedom concerning geometry but brings costly investments in moulds.

It is previously known through for example U.S. Pat. No. 4,779,440 and WO/0074870 to form a blank for a helix drill. The extruded blank has chip flutes with uniform pitch along the circumference of the blank.

It is desirable to provide a rotatable tool and a blank having varying pitch of the flush channels.

It is desirable to provide a tool having flush channels of varying pitch.

It is desirable to provide a tool having good durability.

According to an aspect of the invention, a rotatable tool is provided, the tool being made of cemented carbide and comprising a shank for mounting in a rotatable spindle, at least one chip flute, a cutting edge formed at a line of intersection between the at least one chip flute and clearance surfaces at a cutting end of the tool, and at least one flush channel extending through the tool to transfer flushing medium to the cutting end of the tool, wherein the flush channel has a varying pitch.

According to another aspect of the invention, a blank for a tool for chip removing machining is provided, the blank being made of solid cemented carbide and comprising at least one space for forming at least one flush channel in the tool, the space extending through the entire blank, wherein the space has a varying pitch.

BRIEF DESCRIPTION OF THE DRAWINGS

The features and advantages of the present invention are well understood by reading the following detailed description in conjunction with the drawings in which like numerals indicate similar elements and in which:

FIG. 1A shows schematically a drill according to the present invention in a side view. FIGS. 1B, 1C and 1D show radial cross section according to lines B-B, C-C, D-D, respectively.

FIG. 1E shows the drill in a perspective view.

FIG. 1F shows a blank according to the present invention in a perspective view.

FIG. 1G shows schematically a drill according to an embodiment of the present invention in a side view.

FIG. 3 shows an elongated green body in a perspective view.

FIG. 4A shows an alternative device for generation of elongated green bodies, in a front view.

FIG. 4B shows the device in cross section according to line IIB-IIB in FIG. 4A.

FIG. 4C shows the device in a cutting end view.

FIG. 4D shows the device in cross section according to the line IID-IID in FIG. 4A.

FIG. 5A shows an additional alternative device for generation of elongated green bodies, in a front view.

FIG. 5B shows the device in cross section according to the line IIB-IIB in FIG. 5A.

FIG. 5C shows the device in a cutting end view.

FIG. 5D shows the device in cross section according to the line IID-IID in FIG. 5A.

FIG. 6A shows an additional alternative device for generation of elongated green bodies, in a front view.

FIG. 6B shows the device in cross section according to line IIB-IIB in FIG. 6A.

FIG. 6C shows the device in a cutting end view.

FIG. 6D shows the device in cross section according to the line IID-IID in FIG. 6A.

DETAILED DESCRIPTION

Figure 2B:
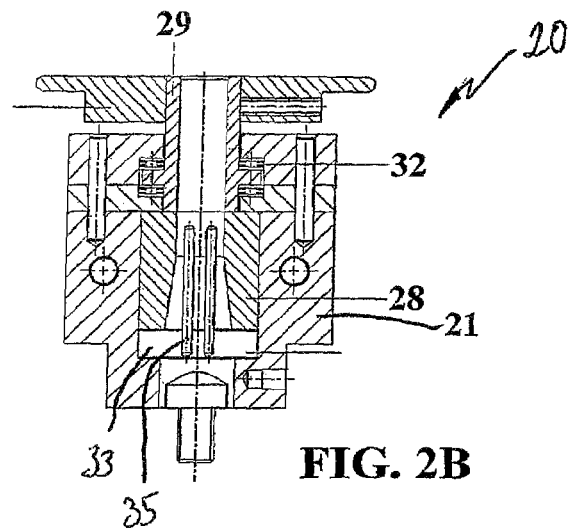
FIG. 2B shows the device in cross section according to the line IIB-IIB in FIG. 2A.

The embodiment of a tool according to invention shown in FIGS. 1A-1E is a so-called helix drill. The drill 10 is made in solid hard material, such as for example extruded cemented carbide, and includes helical chip flutes 18 and these can extend through the entire body or through a part thereof. The drill has a shank 11 to be secured to a rotary spindle, not shown. The drill has two upper clearance surfaces 15. All surfaces and associated edges are made from the same material, i.e. preferably in extruded cemented carbide. Lines of intersection of the chip flutes 18 and the clearance surfaces 15 form main cutting edges 19 at the cutting end of the drill, preferably via reinforcing chamfers 12. The entire length of the drill is chosen from 3 to 10 times its diameter. Two flush channels 14 extend through the entire drill to transfer flushing medium from the spindle to the cutting end of the drill. A diametrical groove can be provided at the shank end to inter alia counteract obstruction of the holes. Both the flush channels 14 and the chip flutes 18 have varying pitch, preferably a small axial angle at the cutting end and increasing, continuously or, as seen with the flush channels 214 and chip flutes 218 shown in FIG. 1G. stepwise, rearwardly. The variation of the pitch of the, for example two, flush channels 14 are preferably substantially identical. The variation of the pitch of the, for example two, chip flutes 18 are preferably substantially identical. The variation of the pitch of the flush channels 14 and of the chip flutes 18 are preferably substantially identical. The pitch is such that the axial angle $\alpha 1$ relative to the center line CL of the drill is bigger at its cutting end 16 than the axial angle $\alpha 2$ at the mid of the chip flutes in the axial direction of the drill. For example the axial angle can vary between 5 and 20° from its cutting end 16 to the axially inner end 17 of the chip flute. The flush channels 14 are provided at substantially constant radial distance from the centerline CL and from the chip flutes 18 for the drill to be as durable as possible. This drill can be made via one of at least four different methods. The unit "mmlrevolution" defines the pitch. The pitch p is proportionally inverted relative to the axial angle α according to this formula:

$$D*\pi/\tan\alpha = p,$$

where D is the diameter of the drill in millimeter, and p is the pitch in millimeter. Example: A drill with D 10 mm and a 30° axial angle in a radial cross section gives the pitch 10*3.14/tan(30°)=54.4 mm.

The axial angle for the axially forward part of the drill lies within the interval of 20°-45° and the rear part of the drill between 5° and 25°. The drill in the shown embodiment has 31° at the cutting end 16 and 16° at the axially inner end 17. By providing the axial angles according to the described geometry low cutting forces are obtained at drilling through the relatively large rake angle at the end 16 as well as an efficient chip flow by means of a relatively small axial angle at axially rearwardly along the chip flutes. In addition, the varying pitch of the flush channels 14 in the drill 10 implies that the exits of the channels can be placed where they give most effect for the drilling process without influencing the area of for example grinding of chip flutes.

FIG. 1F shows a blank for a tool, such as the above-described helix drill 10 or a cutting end mill for chip removing machining. The blank 110 that is cylindrical, is made of solid cemented carbide and comprises spaces 114A, 114B in order to form the flush channels 14 in the drill. The spaces 114 extend through the entire blank. As has been said above the spaces 114 have varying pitch. The pitch for the space 114 is such that the axial angle α11 relative to the center line CCL of the blank is greater at one end 116 than the axial angle α21 at the other end 117 of the blank. The axial angle varies between 5 and 20° from the one end 116 to the other end 117. The axial angle at the axially forward part of the drill 10 lies within the interval of 20°-45° and between 5° and 25° at the rear part of the blank. In FIG. 1F is shown an imaginary plane P where the rotational speed of the green body has been increased whereby also the axial angle for the respective space increases. The spaces 114A, 114B are provided at substantially constant radial distance from the centerline CCL.

Figure 2A:
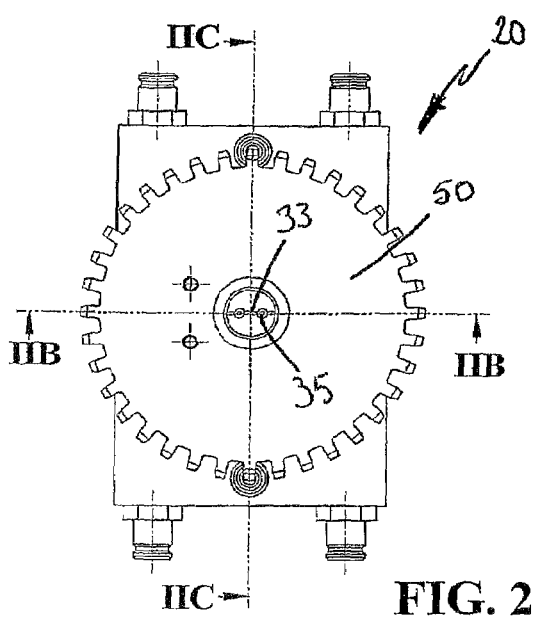
FIG. 2A shows a device for generation of elongated green bodies, in a front view.
Figure 2C:
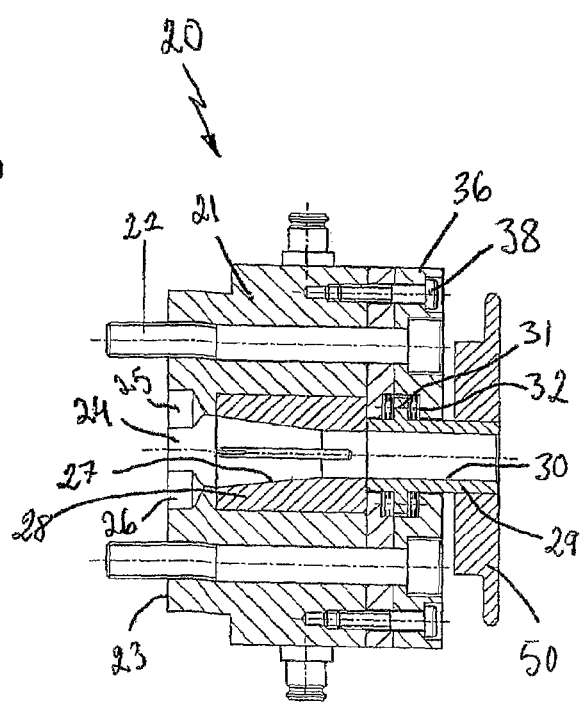
FIG. 2C shows the device in cross section according to the line IIC-IIC in FIG. 2A.

In FIGS. 2A-2C an embodiment of a device 20 for generation of elongated cylindrical green bodies is shown. With the term "green body" is here meant an extruded but not sintered body, while the term "blank" relates to a sintered body. It should be noted that the term "green" does not relate to the colour of the body but relates to an extrudate. The device 20 comprises a rectangular housing 21 of steel, which is intended to be fastened with for instance bolts to a machine for extrusion, not shown. The housing 21 has two bolts 22 to be fastened in the machine and has a rear surface 23 intended to seal against said machine. The housing has a central through-going recess 24 through which a mixture will be pressed. The recess 24 is widened in connection to the rear surface 23 to form spaces 25, 26 for feed worm ends, FIG. 3. The recess 24 transforms into a diameter reducing restriction 27 in a circular nozzle 28. The nozzle 28 is made from a wear resistant material such as cemented carbide. The recess 24 then continues via a cylindrical inner, centrally positioned hole 30 into a circular die 29, which is provided next to and in connection with the nozzle 28. The die 29 is substantially cylindrical and comprises a radially external flange 31, which is intended to cooperate with axial bearings 32 in a lid 36. The external end of the die 29 is provided with a rotational device or a pinion 50, which is rigid with the die. The pinion is intended to be operated by a cog-wheel, not shown. The die can thereby be rotated a infinite number of revolutions together with the pinion 50. The principal feed direction of the mixture is depicted by F. A bar-shaped core 33 is recessed into the die. The core is rectangular and contains two elongated pins 35. The pins 35 are intended to project from the core in the feed direction F to form flush channels in the green body. The recess 24 ends in an open hole in the outer end of the die. The device consequently comprises a rigid part 28 and a rotatable part 29.

The drill or the end mill is manufactured as follows. Hard metal powder having a certain cobalt content and a carrier, for example a polymer or a plastic, is mixed and shaped to pellets or granulates. The content of binder lies within the interval of 1-10 percent by weight. The expression "cobalt" shall here be understood as a metallic binder that alternatively can be exchanged for or include other metals, for example nickel, Ni. Subsequently the mixture is preheated to a temperature suitable for the mixture and is inserted in a machine for extrusion. Then the mixture is pressed at certain pressure and certain temperature, about 180° C., that is considerably lower than at prior art where the melting temperature of cobalt is required, into the recess 24 by means of the two feed worms, said restriction 27 will further compress the mixture or mass. Then the hot mixture reaches the core 33 and passes this on each side through the two substantially semi-circular openings formed about the core. Rearwardly of the core in the feed direction F the mixture fuses again to a cylindrical body except from where the pins 35 form spaces in the body, which later will constitute flush channels. The pins are chosen long enough to allow the mixture to cool such that fusion is avoided. The pins 35 do not reach the rotatable part 29. Subsequently the mixture reaches the space 30 and the mixture is brought to rotate by friction between the mixture and the bore wall. Thereby, a cylindrical green body is attained the channels of which having varying pitch. Then chip flutes are sintered and ground with substantially the same varying pitch as that of the flush channels.

Thus, at extrusion of the green body the mixture is fed into the device that comprises a rigid and a rotatable part. By first being able to shape a green body with flushing holes and then twist it in one and the same device has definitive advantages. A great advantage with this technique is that green bodies can be extruded with both straight and twisted flushing holes in one and the same device, which gives better economy. Another advantage with this technique is however that a compact solution for the manufacture of twisted green bodies is attained. Thereby bulky and expensive equipment is avoided that otherwise would be required for gripping the green body from the outside and then twisting it. The finished green body consequently has been extruded and has obtained entirely or partly twisted flushing holes that also may have varying pitch. The shaping that is plastic, occurs with the aid of a tool that comprises a rigid and a rotatable part. The mixture is fed into in the rigid part of the tool where it is compressed around a fixed core in order to be shaped to a green body with flushing holes. In the next moment the mixture is further fed into in the rotatable part of the tool the driving of which is synchronized with the control system of the machine. The rotatable part has a die that compresses the mixture further and the friction between the mixture and the wall of the hole 30 forces the green body to be twisted. The rotational speed of the die thereby influences the pitch of the flushing holes, which means that green bodies with flushing holes that have varying pitch can be extruded. The greatest advantage with this technique is that one in a very simple manner can influence the pitch of the flushing holes by changing the rotational speed of the die. The varying pitch is attained by changing the rotational speed of the die under controlled conditions during the process. Also the chip flutes must be created by grinding with corresponding pitch at a blank with chip flutes having varying pitch. With regard to drilling in certain materials a drill which has chip flutes of varying pitch can be a better product.

In FIGS. 4A-4D is shown an alternative embodiment of a device 20' for manufacture of elongated green bodies with external grooves such as is shown in FIG. 3. What differs this device 20' from the device 20 is foremost that the device 20' comprises a portion 42 provided on level with the ends of the pins 35, which portion comprises two movable parts 40, 41 that project radially into the recess 24 between the nozzle 28 and the die 29 in order to emboss chip flutes in the green body. Each movable part 40, 41 comprises an inner rounded end. The end is symmetrically shaped and is provided on a bar. The bar runs in a hole in an intermediate part. A shoulder is provided on the bar in the vicinity of the end. The shoulder is intended to cooperate with a collar in the hole in order to obtain the correct projection into the space of the intermediate part. At extrusion of current green bodies the extrudate is fed into the device and passes in this case first cores 33, 35 that shape flushing holes. In the next phase the extrudate is compressed in order to again be homogenized after partition at the core. The extrudate now passes the part in device where the plastic shaping of the chip flutes occur. Two cylindrical cores or movable parts 40, 41, each having one end shaped according to the desired chip flute profile, are assembled at suitable partition, for example 180°, in the device. Said one end is preferably rounded. The cores bottom in the device at full chip flute depth and are coupled to suitable control and automatic engineering, not shown, outside of the device. After reaching the desired chip flute length the cores are pulled back and the extrudate reverts to the roundness that is necessary to shape the drill shank. After formation of the chip flutes the extrudate is pressed further into a rotatable part of the device, which through friction twists the extrudate and then also the chip flutes. The rotational speed determines what pitch the chip flutes get. It also becomes possible to combine straight and twisted chip flutes in one and the same blank that results in better products.

In FIGS. 5A-5D is shown an alternative embodiment of a device 20" for generation of elongated green bodies with external grooves such as is shown in FIG. 3. What differs this device 20" from the device 20' is foremost the two movable parts or jaws 40', 41' of the portion 42'. Each jaw 40', 41' comprises an inner end provided with a cutting edge. The profile of the cutting edge is the same as the desired chip flute profile. Each jaw has chip space of its own that runs from the center of the cutting insert, through the jaw, and out from the device. The profile of the cutting edge and the motion of the jaw make that the chip flute profile in the extrudate is changed in pace with the cutting depth. If desired also the cutting insert can be developed such that the profile of the chip flute does not vary with the cutting depth. This means that green bodies with varying chip flute depth and profile can be extruded, which results in improved products. Furthermore, optimal ends of the chip spaces can be obtained which is not always the case with the device 20'. The extrudate gives in this situation green bodies with straight chip flutes and flushing holes. In the last phase of the device the extrudate is finely calibrated and is pressed further into a rotatable die 29 that twists chip flutes and flushing holes to desired pitch.

In FIGS. 6A-6D is shown an alternative embodiment of a device 20''' for generation of elongated green bodies with external grooves such as is shown in FIG. 3. What differs this device 20''' from the device 20' is foremost the two movable parts or cutting inserts 40'', 41'' of the portion 42''. Each cutting insert 40'', 41'' comprises an inner end provided with a cutting edge. Two cutting inserts, or more, at suitable partition are assembled on shafts which makes them possible to pivot. The shafts terminate on the upper side of the tool and is coupled to suitable control and automatic engineering. The noses of the cutting inserts have the desired chip flute profile at a 45° angle, relative to the center line CL1 of the recess, and when the extrudate passes the cutting inserts material is machined and chip flutes are formed. Machined material leaves the device by means of the chip flutes of the tool. The lower side of each cutting insert has the same radius as the green body, which makes when the cutting inserts pivot back that the device seals tightly as if no cutting insert was present. With the cutting inserts in this position the shaping of the chip flutes ceases and the extrudate surpasses to the roundness that is necessary to shape drill shanks. The combination with the extrudate being machined in a hot condition close to the creation of the green body and the material being machined instead of being deformed when chip flutes are formed, results in better products.

When the green body comes out from the jaws it cools quickly due the surrounding temperature and the green body continues to extrude until the chip flute part is sufficiently long. The length of the green body is determined by how long the extrusion is continued. The solidified green body can then be cut or simply be broken, for example by hand, in suitable lengths in interval of 5-10 times its diameter.

Then the green body is heated in a separate furnace such that the carrier is burned off and such that the binder metal melts and binds the carbides, such that a blank is formed. Then further machining of the blank takes place, such as for example grinding of edge portions, shank portion and clearance surfaces.

With the present method and device a tool can be produce whereby varying pitch can be obtained both for flush channels and chip flutes.

Thus the present invention relates to a rotatable tool and a blank with varying pitch at the flush channels, which makes a tool with good durability possible.

The disclosures in Swedish patent application Nos. 0301828-0 and 0301617-7, from which this application claims priority are incorporated herein by reference.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is in no way limited to the above described embodiments but can be varied freely within the scope of the appended claims. Thus the invention can be used also for solid end mills. The tool can be coated with layers of for example Al2O3, TiN and/or TiCN.

What is claimed is:

1. A rotatable tool, the tool being made of cemented carbide and comprising a shank for mounting in a rotatable spindle, at least one chip flute, a cutting edge formed at a line of intersection between the at least one chip flute and clearance surfaces at a cutting end of the tool, and at least one flush channel extending through the tool to transfer flushing medium to the cutting end of the tool, wherein the at least one chip flute and the at least one flush channel each have a varying pitch, the pitch of the at least one chip flute and the at least one flush channel being substantially identical.

2. The tool according to claim 1, wherein an axial angle of the at least one flush channel and the at least one chip flute each decreases in a direction away from the cutting end of the tool.

3. The tool according to claim 2, wherein the axial angle of the at least one flush channel and the at least one chip flute decreases continuously in a direction away from the cutting end of the tool.

4. The tool according to claim 2, wherein the axial angle of the at least one flush channel and the at least one chip flute decreases in a step-wise fashion in a direction away from the cutting end of the tool.

5. The tool according to claim 1, wherein an axial angle of the at least one flush channel is bigger at the cutting end of the tool than the axial angle of the at least one flush channel at a mid-point of the at least one flush channel in an axial direction of the tool.

6. The tool according to claim 5, wherein the axial angle of the at least one flush channel changes between 5° and 20° from the cutting end to an axially rear end of the chip flute.

7. The tool according to claim 6, wherein the axial angle of the at least one flush channel at the cutting end of the tool lies within the interval of 20°-45° and the axial angle of the at least one flush channel at an axially rear part of the tool lies within the interval of 5° and 25°.

8. The tool according to claim 1, wherein an axial angle of the at least one flush channel is larger at the cutting end of the tool than the axial angle of the at least one flush channel at a mid-point of the at least one flush channel in an axial direction of the tool.

9. The tool according to claim 8, wherein the axial angle of the at least one flush channel changes between 5° and 20° from the cutting end to an axially rear end of the chip flute.

10. The tool according to claim 9, wherein the axial angle of the at least one flush channel at the cutting end of the tool lies within the interval of 20°-45° and the axial angle of the at least one flush channel at an axially rear part of the tool lies within the interval of 5° and 25°.

11. The tool according to claim 1, wherein the tool is one of a helix drill and an end mill.

* * * * *